(12) United States Patent
Kramer et al.

(10) Patent No.: US 11,519,252 B2
(45) Date of Patent: Dec. 6, 2022

(54) SYSTEMS AND METHODS FOR MANUFACTURING AND DELIVERING FRACTURING FLUID TO MULTIPLE WELLS FOR CONDUCTING FRACTURING OPERATIONS

(71) Applicant: Halliburton Energy Services, Inc., Houston, TX (US)

(72) Inventors: Cameron Michael Kramer, Duncan, OK (US); Wesley John Warren, Marlow, OK (US); Chad Adam Fisher, Cache, OK (US); Austin Carl Schaffner, Bixby, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/314,610

(22) Filed: May 7, 2021

(65) Prior Publication Data

US 2022/0356790 A1 Nov. 10, 2022

(51) Int. Cl.
| | |
|---|---|
| *E21B 43/26* | (2006.01) |
| *C09K 8/62* | (2006.01) |
| *C09K 8/80* | (2006.01) |
| *B01F 23/50* | (2022.01) |
| *B01F 35/221* | (2022.01) |
| *B01F 101/49* | (2022.01) |

(52) U.S. Cl.
CPC ............. *E21B 43/26* (2013.01); *B01F 23/59* (2022.01); *B01F 35/2217* (2022.01); *C09K 8/62* (2013.01); *C09K 8/80* (2013.01); *B01F 2101/49* (2022.01)

(58) Field of Classification Search
CPC .... E21B 43/267; E21B 43/26; E21B 41/0057; E21B 43/2607; E21B 43/30; E21B 43/04; E21B 43/305
See application file for complete search history.

(56) References Cited

U.S. PATENT DOCUMENTS

| | | | |
|---|---|---|---|
| 5,799,734 A | 9/1998 | Norman et al. | |
| 7,621,329 B1 | 11/2009 | Case | |
| 7,841,394 B2 | 11/2010 | Mcneel et al. | |
| 7,931,082 B2 | 4/2011 | Surjaatmadja | |
| 8,056,635 B2 | 11/2011 | Shampine et al. | |
| 8,316,935 B1 | 11/2012 | Termine et al. | |
| 8,360,152 B2 | 1/2013 | Defosse et al. | |
| 9,803,457 B2 | 10/2017 | Shampine et al. | |
| 10,518,229 B2 | 12/2019 | Morris et al. | |
| 2007/0125543 A1 | 6/2007 | Mcneel et al. | |
| 2007/0125544 A1 | 6/2007 | Robinson et al. | |
| 2020/0223346 A1* | 7/2020 | Welch | B65D 88/129 |

(Continued)

FOREIGN PATENT DOCUMENTS

WO 2020046264 A1 3/2020

*Primary Examiner* — Zakiya W Bates
(74) *Attorney, Agent, or Firm* — K&L Gates LLP

(57) ABSTRACT

A method of conducting fracturing operations at multiple wellsites in a field. The method may include manufacturing a first fracturing fluid concentrate at a fluid manufacturing plant located at a sand mine of the field using sand produced from the sand mine. The method may also include pumping the first fracturing fluid concentrate from the fluid manufacturing plant to a first well and a second well of the multiple wellsites. The method may further include injecting the first fracturing fluid concentrate into a first well at the first wellsite.

18 Claims, 3 Drawing Sheets

(56) References Cited

U.S. PATENT DOCUMENTS

2020/0240240 A1     7/2020   Oehler et al.
2020/0385955 A1* 12/2020   Morris ...................... E02F 7/00
2020/0406936 A1* 12/2020   Entchev ................... E21B 7/00

* cited by examiner

SYSTEMS AND METHODS FOR MANUFACTURING AND DELIVERING FRACTURING FLUID TO MULTIPLE WELLS FOR CONDUCTING FRACTURING OPERATIONS

BACKGROUND

Subterranean formations may contain petroleum, natural gas, or other hydrocarbons, but may have a poor hydrocarbon flow rate due to formation characteristics such as low permeability, or from damage or clogging of the formation during drilling. Low permeability and damage or clogging of the formation is particularly common in tight sands and shale formations, among others.

To increase and/or enhance flow rate, a well drilled within a poor flow rate formation may be stimulated after the well is drilled. The formation may be stimulated by fracturing by injecting a pressurized liquid into the well and perforation tunnels to create cracks in the formations through which natural gas, petroleum, and other hydrocarbons are able to flow more freely. When pressure is removed from the well, proppants (e.g., small grains of sand, aluminum oxide, among others) hold the fractures open, allowing hydrocarbons to flow from the formation and into the well (referred to as production).

Often, sand to be used as proppant is mined elsewhere at the well field and delivered to the wellsite via containers where the proppant is blended with fluids and fluid additives at the wellsite to create a fracturing fluid. However, the sand produced from a sand mine is often wet due to operations that occur at the sand mine (e.g., cleaning, sizing, etc.) and the wet sand can be difficult to completely remove from the containers. Accordingly, additional sand must be brought to the wellsite to meet the required volume. To address this, sand can be dried prior to being stored in containers; however, the drying operations increase the cost associated with mining and storing the sand.

BRIEF DESCRIPTION OF THE DRAWINGS

Embodiments of the systems for manufacturing and delivering fracturing fluid to multiple wells are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure provides systems for manufacturing and delivering fracturing fluid to multiple wells as well as conducting fracturing operations. The systems include equipment located at sand mines that use the sand from the mines to produce fracturing fluid that is then pumped to individual wellsites within a field and/or to individual wells at a single wellsite. Once received at the wellsites, each wellsite can create different fracturing fluids at the wellsite by adding clean fluid and one or more fluid additives to the fracturing fluid produced by the system. Fracturing fluid produced by the system may also be stored at the wellsites. Manufacturing the fracturing fluid at the sand mine eliminates the need to produce fracturing fluid at the wellsite. Further, since the sand is not stored in containers prior to use, the sand does not need to be dried or additional wet sand does not need to be provided, further reducing the costs associated with production of fracturing fluid.

A subterranean formation containing oil or gas hydrocarbons may be referred to as a reservoir, in which a reservoir may be located on-shore or off-shore. Reservoirs are typically located in the range of a few hundred feet (shallow reservoirs) to tens of thousands of feet (ultra-deep reservoirs). To produce oil, gas, or other fluids from the reservoir, a well is drilled into a reservoir or adjacent to a reservoir. A well can include, without limitation, an oil, gas, or water production well, or an injection well. As used herein, a "well" includes at least one borehole having a borehole wall. A borehole can include vertical, inclined, and horizontal portions, and it can be straight, curved, or branched. As used herein, the term "borehole" includes any cased, and any uncased, open-hole portion of the borehole. Further, the term "uphole" refers a direction that is towards the surface of the well, while the term "downhole" refers a direction that is away from the surface of the well.

Figure 1:
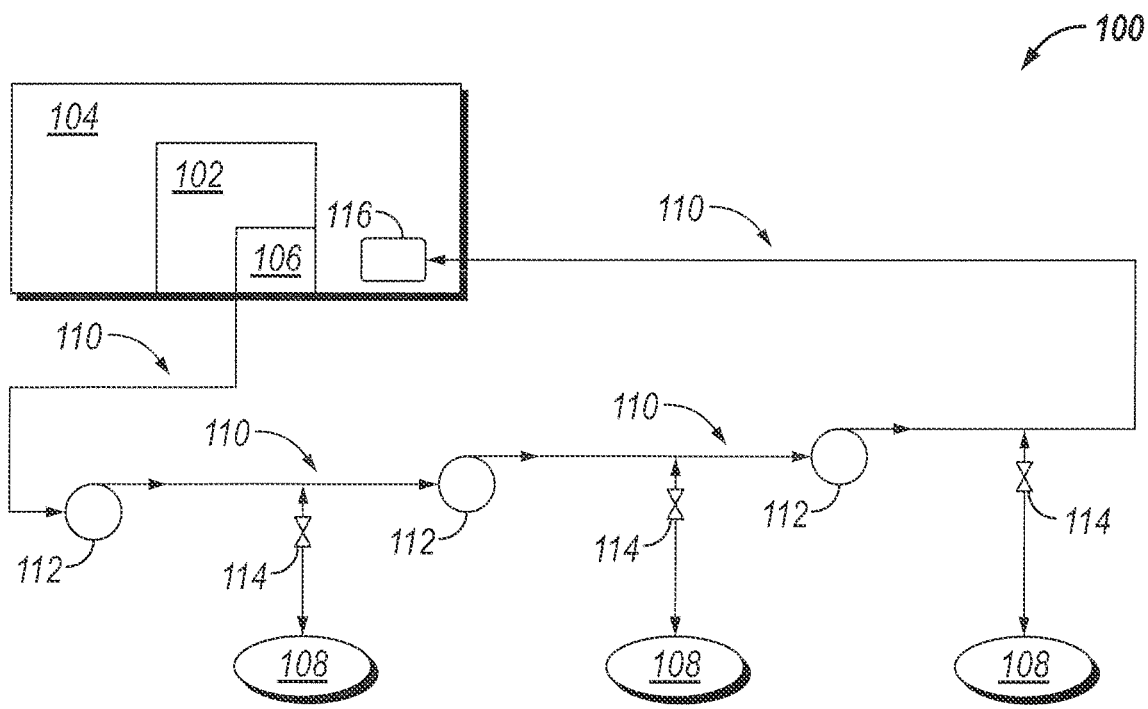
FIG. 1 is a schematic diagram of a fluid manufacturing and delivery system, according to one or more embodiments.

Turning now to FIG. 1, FIG. 1 is a fluid manufacturing and delivery system 100, according to one or more embodiments. The fluid manufacturing and delivery system 100 includes a fluid manufacturing plant 102 located at a sand mine 104. Sand produced from the sand mine 104 is sized to remove particles larger than the desired size of sand particle and combined with clean fluid (i.e., fluid that does not contain sand and/or other proppants) and, optionally, one or more fluid additives to produce a fracturing fluid concentrate, as described in more detail below. The fluid manufacturing plant 102 also includes a pumping system 106 that pumps the fracturing fluid concentrate to multiple wellsites 108 via a pipeline 110. The fracturing fluid concentrate may be pumped at a low pressure (e.g., a pressure that is not sufficient to fracture a formation at a wellsite) or at a high pressure (e.g., a pressure sufficient to fracture a formation at a wellsite). In the illustrated embodiment, boost pump systems 112 are used to maintain the pressure of the fracturing fluid concentrate within the pipeline 110. In other embodiments, one or more of the boost pump systems 112 may be omitted.

Figure 2:
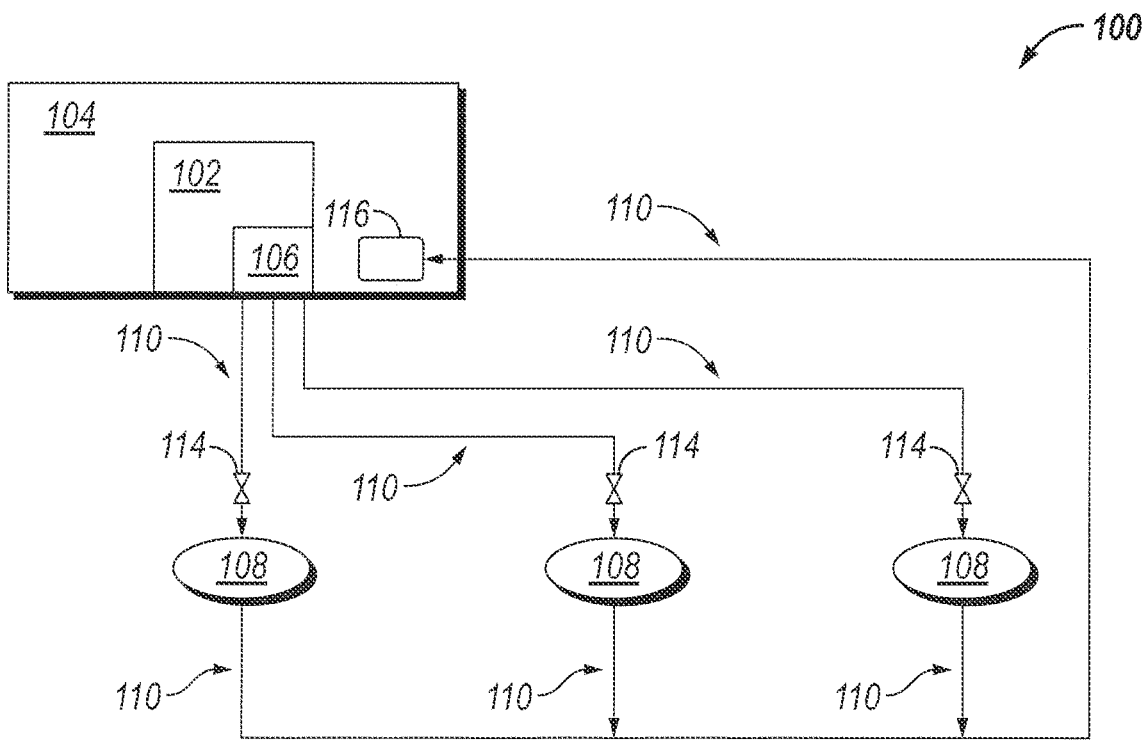
FIG. 2 is a schematic diagram of a fluid manufacturing and delivery system, according to one or more embodiments.

As shown in FIG. 1, the fracturing fluid concentrate may be pumped to the wellsites 108 in series via a circuit formed from the pipeline 110. The fracturing fluid concentrate may also be pumped to the wellsites 108 in parallel via multiple pipelines 110, as shown in FIG. 2. Configuring the wellsites 108 in parallel via multiple pipelines 110 may allow different fracturing fluid concentrates to be delivered to different wellsites at the same time, instead of each wellsite receiving fracturing fluid concentrate through the same pipeline 110. Additionally, the wellsite clean fluid system and the wellsite fluid additive system, described in more detail below, may be located at the fluid manufacturing plant 102 and the fluid and additives contained within the wellsite clean fluid system and the wellsite fluid additive system may be delivered to the wellsite via the pipeline 110 or other pipelines (not shown).

Valves 114 or other flow control equipment may be used to control the flow of fracturing fluid concentrate from the fluid manufacturing plant 102 to each wellsite 108. At each wellsite 108, the fracturing fluid concentrate is combined with additional clean fluid and/or one or more fluid additives to create a fracturing fluid to be used at the respective wellsite, as described in more detail below. Accordingly, each wellsite 108 may utilize a different fracturing fluid produced using the fracturing fluid concentrate as a base. In other embodiments, the fracturing fluid concentrate produced by the fluid manufacturing plant 102 may be used for fracturing operations at a wellsite without being mixed with additional clean fluid and/or additives.

Fluid circulating through the pipeline 110 and fluid returned uphole from the wells at the wellsites 108 is returned to the fluid manufacturing plant 102 or to a recovery pit 116 in fluid communication with the fluid manufacturing plant 102. Once the fracturing fluid is returned, at least a portion of the sand and/or fluid is cleaned and/or filtered and reused by the fluid manufacturing plant 102 to produce more fracturing fluid concentrate.

Figure 3:
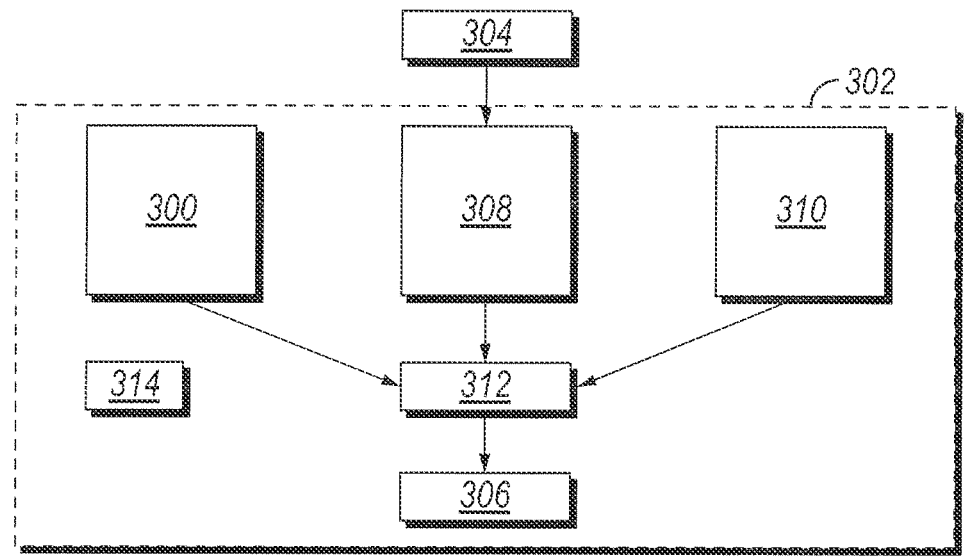
FIG. 3 a schematic view of a fluid manufacturing plant, according to one or more embodiments.

Turning now to FIG. 3, FIG. 3 is a schematic view of a fluid manufacturing plant 302, according to one or more embodiments. The fluid manufacturing plant 302 includes a clean fluid system 300, a sand processing system 308, a fluid additive system 310, a fluid mixing system 312, and a pumping system 306.

As discussed above, the fluid manufacturing plant 302 receives sand from a sand mine 304 via augers, conveyer belts, bucket conveyers, or similar equipment. The sand processing system 308 then sorts the sand via screens or similar methods into different mesh sizes (e.g., 100 mesh, 40/70 mesh, etc.) for use in fracturing fluid concentrate. The sand processing system 308 also includes augers, conveyer belts, bucket conveyers, or similar equipment that delivers the sand to the fluid mixing system 312.

The clean fluid system 300 includes storage tanks (not shown) to hold clean fluid, such as, but not limited to, fresh water or flow-back water from previous fracturing operations. The clean fluid system 300 also includes one or more pumps (not shown) that pumps the clean fluid to the fluid mixing system 312.

The fluid additive system 310 includes storage tanks (not shown) to hold fluid additives, one or more pumps (not shown), augers, or similar equipment that delivers one or more fluid additives to the fluid mixing system 312. Additives include, but are not limited to, friction reducers, surfactants, polymers, polymer breakers, diversion additives, corrosion inhibitors, scale inhibitors, clay control agents, and pH control additives.

The clean fluid system 300, the sand processing system 308, the fluid additive system 310 deliver the clean fluid, the sand, and the fluid additives, respectively, to the fluid mixing system 312, which includes a blender (not shown) or similar equipment to produce the fracturing fluid concentrate. The pumping system 306 then pumps the fracturing fluid concentrate produced by the fluid manufacturing plant 302 to wellsites, as described above.

A control system 314 is in electronic communication with the clean fluid system 300, the sand processing system 308, the fluid additive system 310, the fluid mixing system 312, and/or the pumping system 306. The control system 314 controls the amounts and/or flowrates of clean fluid, the amount and size of sand, and the amount of fluid additives delivered to the fluid mixing system 312 based on user input, the amounts and/or flowrates of other components (e.g., clean fluid) of the fracturing fluid concentrate, the requirements of fracturing operations at wellsites, and/or other factors. In this manner, the fluid manufacturing plant 302 may produce fracturing fluids that include different clean fluids, sizes of sand, and/or fluid additives, depending on the needs of the wellsite(s) conducting fracturing operations. The control system 314 also controls the pressure and/or flowrate of the fracturing fluid concentrate based on user input, the requirements of fracturing operations at wellsites, and/or other factors.

Figure 4:
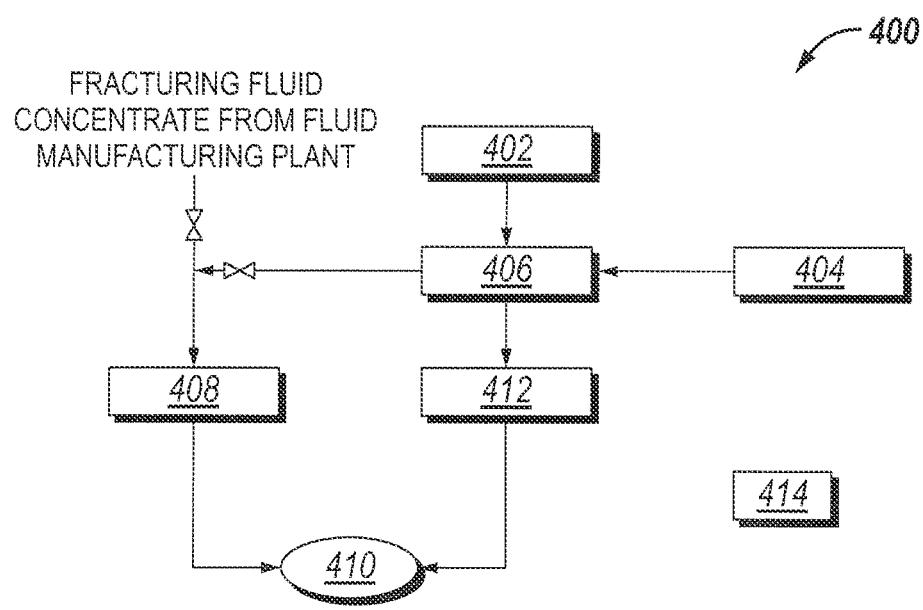
FIG. 4 is a schematic view a well fracturing system, according to one or more embodiments.

Turning now to FIG. 4, FIG. 4 is a schematic view a well fracturing system 400, according to one or more embodiments. The well fracturing system 400 is located at a wellsite 108 from FIGS. 1 and 2 and includes a wellsite clean fluid system 402, a wellsite fluid additive system 404, a boost pump system 406, a fracturing pump system 408 for pumping dirty fracturing fluid (i.e., fracturing fluid that includes sand and/or other proppants) into a well 410, and a fracturing pump system 412 for pumping clean fracturing fluid into the well 410. In one or more embodiments, the wellsite 108 also includes a second well having a second well fracturing system (not shown) and the fracturing fluid pumping systems 408, 412 are also operable to pump fracturing fluids into the second well. The well fracturing system 400 also includes a wellsite control system 414 in electronic communication with the wellsite clean fluid system 402, the wellsite fluid additive system 404, the boost pump system 406, and/or the fracturing pump systems 408, 412. In one or more embodiments, a single control system may control the equipment 300, 308, 310 at the fluid manufacturing plant 302 and the equipment 404, 406, 408, 412 at the wellsite 108.

The wellsite clean fluid system 402 includes storage tanks (not shown) to hold clean fluid, such as, but not limited to, fresh water or flow-back water from previous fracturing operations. The clean fluid system 402 may also include one or more pumps (not shown) that pump the clean fluid to the fracturing pump system 412 to provide clean fracturing fluid to dilute the fracturing fluid concentrate from the fluid manufacturing plant 302. In other embodiments, the boost pump system 406 may pump the clean fluid from the wellsite clean fluid system 402 to the fracturing pump system 412.

The wellsite fluid additive system 404 includes storage tanks (not shown) to hold fluid additives, such as, but not limited to, friction reducers, surfactants, polymers, polymer breakers, diversion additives, corrosion inhibitors, scale inhibitors, clay control agents, and pH control additives. The wellsite fluid additive system 404 may also include one or more pumps (not shown) or similar equipment that delivers one or more fluid additives to the fracturing pump system 412 for clean fracturing fluid. In other embodiments, the boost pump system 406 may pump the fluid additives from the wellsite clean fluid system 402 to the fracturing pump system 412.

In operation, the well fracturing system 400 receives fracturing fluid concentrate from a fluid manufacturing plant, as described above. In one or more embodiments, the fracturing fluid concentrate is then injected downhole into the well 410 via the fracturing pump system 408 for dirty fracturing fluid at a pressure sufficient to fracture a formation surrounding the well 410.

As the fracturing fluid concentrate is injected downhole, the wellsite control system 414 determines an amount and/or a flowrate of clean fluid from the wellsite clean fluid system 402 and an amount and/or a flowrate of fluid additives from the wellsite fluid additive system 404 to be injected downhole via the fracturing pump system 412 for clean fracturing fluid based on user input, the requirements of fracturing operation at the wellsite, and/or other factors. The clean fluid and fluid additives are then injected downhole at approximately the same pressure as the injection pressure of the fracturing fluid concentrate. In other embodiments, the boost pump system 406 may pressurize the clean fluid and fluid additives to approximately the same pressure as the fracturing fluid concentrate received from the fluid manufacturing plant and pump the clean fluid and fluid additives into the fracturing fluid concentrate prior to the fracturing fluid concentrate being injected downhole via the fracturing pump system 408.

Figure 5:
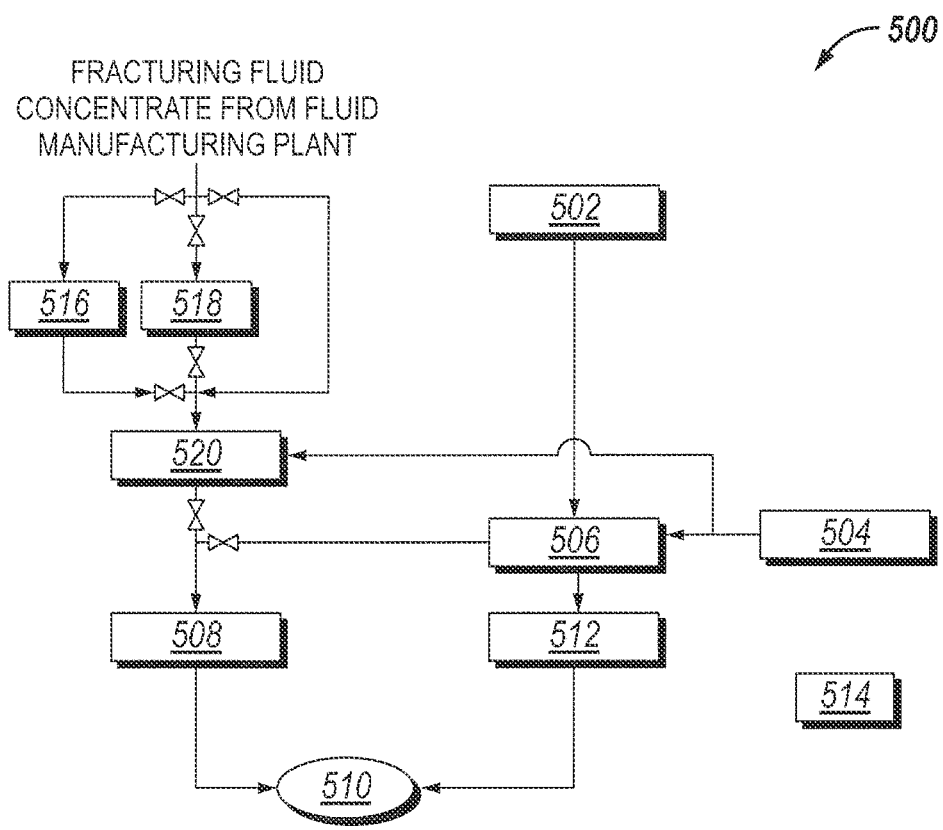
FIG. 5 is a schematic view a well fracturing system, according to one or more embodiments.

Turning now to FIG. 5, FIG. 5 is a schematic view a well fracturing system 500, according to one or more embodiments. FIG. 5 includes many features that are similar to the features described above with reference to FIG. 4. Accordingly, such features will not be described again in detail, except as necessary for the understanding of the well fracturing system 500 shown in FIG. 5.

Similar to the fracturing system 400 described above, FIG. 5 shows another embodiment of a well fracturing system 500 that includes a wellsite clean fluid system 502, a wellsite fluid additive system 504, a boost pump system 506, a fracturing pump system 508 for pumping dirty fracturing fluid (i.e., fracturing fluid that includes sand and/or other proppants) into a well 510, and a fracturing pump system 512 for pumping clean fracturing fluid into the well 510. The well fracturing system 500 also includes concentrate storage containers (two shown 516, 518) and a slurry boost pump system 520. The well fracturing system 400 also includes a wellsite control system 514 in electronic communication with the wellsite clean fluid system 502, the wellsite fluid additive system 504, the boost pump system 506, the fracturing pump systems 508, 512, the concentrate storage containers 516, 518, and/or the slurry boost pump system 520. In one or more embodiments, a single control system may control the equipment 300, 308, 310 at the fluid manufacturing plant 302 and the equipment 504, 506, 508, 512, 516, 518, 520 at the wellsite 108.

The concentrate storage containers 516, 518 each contain a different fracturing fluid concentrate received from a fluid manufacturing plant. For example, the fracturing fluid concentrates stored in the concentrate storage containers may include different amounts clean fluid, different amounts and/or sizes of sand, and/or different amounts and/or types of fluid additives.

The slurry boost pump system 520 pumps one fracturing fluid concentrate or a mix of two or more fracturing fluid concentrates from the concentrate storage containers 516, 518 to the fracturing pump system 508 for dirty fracturing fluid. The wellsite control system 514 determines which fracturing fluid concentrate or which mix of two or more fracturing fluid concentrates will be injected downhole via the fracturing pump system 508 based on user input, the requirements of fracturing operation at the wellsite, and/or other factors. Additionally, as shown in the illustrated embodiment, fluid additives from the wellsite fluid additive system 504 may be added to the fracturing fluid concentrate pumped to the fracturing pump system 508.

Once the fracturing fluid concentrate or combination of fracturing fluid concentrates is pumped to the fracturing pump system 508 by the slurry boost pump system 520, the well fracturing system 500 operates in a similar manner to the well fracturing system 400 described above.

Further examples include:

Example 1 is a method of conducting fracturing operations at multiple wells in a field. The method includes manufacturing a first fracturing fluid concentrate at a fluid manufacturing plant located at a sand mine of the field using sand produced from the sand mine. The method also includes pumping the first fracturing fluid concentrate from the fluid manufacturing plant to a first well and a second well of the multiple wells. The method further includes injecting the first fracturing fluid concentrate into a first well at the first well.

In Example 2, the embodiments of any preceding paragraph or combination thereof further include wherein manufacturing the first fracturing fluid concentrate comprises combining clean fluid and one or more fluid additives with the sand produced from the sand mine.

In Example 3, the embodiments of any preceding paragraph or combination thereof further include mixing the first fracturing fluid concentrate with at least one of additional clean fluid or additional fluid additives at the first well.

In Example 4, the embodiments of any preceding paragraph or combination thereof further include manufacturing a second fracturing fluid concentrate at the fluid manufacturing plant using the sand produced from the sand mine, wherein the second fracturing fluid concentrate is different from the first fracturing fluid concentrate.

In Example 5, the embodiments of any preceding paragraph or combination thereof further include pumping the second fracturing fluid concentrate from the fluid manufacturing plant to the first well. The method further includes storing at least one of the first fracturing fluid concentrate or the second fracturing fluid concentrate at the first well.

In Example 6, the embodiments of any preceding paragraph or combination thereof further include injecting at least one of the first fracturing fluid concentrate or the second fracturing fluid concentrate into the second well.

In Example 7, the embodiments of any preceding paragraph or combination thereof further include wherein the first well and the second well are located at a same wellsite.

In Example 8, the embodiments of any preceding paragraph or combination thereof further include wherein the first well and the second well are located at different wellsites.

Example 9 is a fluid manufacturing plant located at a sand mine and operable to produce a fracturing fluid concentrate for multiple wells in a field. The fluid manufacturing plant includes a fluid mixing system, a sand processing system, a clean fluid system, a fluid additive system, and a pumping system. The fluid mixing system is operable to mix the fracturing fluid concentrate. The sand processing system is operable to receive sand produced from the sand mine and deliver the sand to the fluid mixing system. The clean fluid system is in fluid communication with the fluid mixing system and operable to deliver clean fluid to the fluid mixing system. The fluid additive system is in fluid communication with the fluid mixing system and operable to deliver one or more fluid additives to the fluid mixing system. The pumping system is operable to pump the fracturing fluid concentrate from the fluid manufacturing plant to the wells via a pipeline.

In Example 10, the embodiments of any preceding paragraph or combination thereof further include wherein the pumping system is operable to pump the fracturing fluid concentrate to a first well of the multiple well and a second well of the multiple wells, the first well and the second well located at different wellsites.

In Example 11, the embodiments of any preceding paragraph or combination thereof further include a control system operable to control at least one of an amount or a flowrate of clean fluid, at least one of an amount or a flowrate of sand, and at least one of an amount or a flowrate of the one or more fluid additives delivered to the fluid mixing system.

In Example 12, the embodiments of any preceding paragraph or combination thereof further include wherein the pumping system is further operable to pump a first fracturing fluid concentrate to a first well and to pump a second fracturing fluid concentrate to a second well, wherein the second fracturing fluid is different from the first fracturing fluid.

Example 13 is a system for conducting fracturing operations at multiple wells in a field. The system includes a fluid manufacturing plant located at a sand mine and operable to produce a fracturing fluid concentrate and well fracturing systems in fluid communication with the fluid manufacturing plant to receive the fracturing fluid concentrate. Each well fracturing system is located at a respective well and operable to inject the fracturing fluid concentrate downhole into the well. The fluid manufacturing plant includes a fluid mixing system, a sand processing system, a clean fluid system, a fluid additive system, and a pumping system. The fluid mixing system is operable to mix the fracturing fluid concentrate. The sand processing system is operable to receive sand produced from the sand mine and deliver the sand to the fluid mixing system. The clean fluid system is in fluid communication with the fluid mixing system and operable to deliver clean fluid to the fluid mixing system. The fluid additive system is in fluid communication with the fluid mixing system and operable to deliver one or more fluid additives to the fluid mixing system. The pumping system is operable to pump the fracturing fluid concentrate from the fluid manufacturing plant to the wellsites via a pipeline.

In example 14, the embodiments of any preceding paragraph or combination thereof further include wherein a first well fracturing system of the well fracturing systems is located at a same wellsite as a second well fracturing system of the well fracturing systems.

In Example 15, the embodiments of any preceding paragraph or combination thereof further include wherein the fluid manufacturing plant further comprises a control system operable to control at least one of at least one of an amount or a flowrate or a flowrate of clean fluid, at least one of an amount or a flowrate of sand, and at least one of an amount or a flowrate of the one or more fluid additives delivered to the fluid mixing system.

In Example 16, the embodiments of any preceding paragraph or combination thereof further include wherein the pumping system is further operable to pump a first fracturing fluid concentrate to a first well fracturing system and to pump a second fracturing fluid concentrate to a second well fracturing system, wherein the second fracturing fluid is different from the first fracturing fluid.

In Example 17, the embodiments of any preceding paragraph or combination thereof further include wherein each well fracturing system includes a wellsite clean fluid system in fluid communication with the well, a wellsite fluid additive system in fluid communication with the well, and a fracturing pump system operable to inject the fracturing fluid concentrate into the well.

In Example 18, the embodiments of any preceding paragraph or combination thereof further include wherein each well fracturing system further includes a wellsite control system operable to control at least one of an amount or a flowrate of clean fluid from the wellsite clean fluid system and at least one of an amount or a flowrate of one or more fluid additives from the wellsite fluid additive system injected into the well.

In Example 19, the embodiments of any preceding paragraph or combination thereof further include wherein a first well includes a first concentrate storage that stores a first fracturing fluid concentrate produced by the fluid manufacturing plant and a second concentrate storage that stores a second fracturing fluid concentrate produced by the fluid manufacturing plant.

In Example 20, the embodiments of any preceding paragraph or combination thereof further include wherein a first well fracturing system of the well fracturing systems is located at a different wellsite than a second well fracturing system of the well fracturing systems.

As used herein, the term "approximately" includes all values within 5% of the target value; e.g., approximately 100 includes all values from 95 to 105, including 95 and 105.

As used herein, the term "electronic communication" includes both wired communication between electronic components and/or electronic devices and wireless communication be between electronic components and/or electronic devices. "Electronic communication" also includes electronic components and/or electronic devices that are in wired or wireless electronic communication via intermediate electronic components and/or electronic devices.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "embodiments," "some embodiments," "certain embodiments," or similar language means that a particular feature, structure, or characteristic described in connector with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A fluid manufacturing plant located at a sand mine in a well field and operable to produce fracturing fluid concentrate for multiple wells at one or more wellsites remote from the sand mind and located in the well field, the fluid manufacturing plant comprising:
   a fluid mixing system;
   a sand processing system operable to receive sand produced from the sand mine and deliver the sand to the fluid mixing system;
   a clean fluid system in fluid communication with the fluid mixing system and operable to deliver clean fluid to the fluid mixing system;

a fluid additive system in fluid communication with the fluid mixing system and operable to deliver one or more fluid additives to the fluid mixing system;

wherein the fluid mixing system is operable to mix the sand, the clean fluid, and one or more fluid additives to form a first fracturing fluid concentrate; and a pumping system operable to pump the first fracturing fluid concentrate from the fluid manufacturing plant to the wells via a pipeline.

2. The fluid manufacturing plant of claim 1, wherein the pumping system is operable to pump the first fracturing fluid concentrate to a first well of the multiple well and a second well of the multiple wells, the first well and the second well located at different wellsites.

3. The fluid manufacturing plant of claim 1, further comprising a control system operable to control at least one of an amount or a flowrate of clean fluid, at least one of an amount or a flowrate of sand, and at least one of an amount or a flowrate of the one or more fluid additives delivered to the fluid mixing system.

4. The fluid manufacturing plant of claim 1, wherein the pumping system is further operable to pump the first fracturing fluid concentrate to a first well and to pump a second fracturing fluid concentrate to a second well, wherein the second fracturing fluid is different from the first fracturing fluid.

5. The fluid manufacturing plant of claim 1, wherein the first fracturing fluid concentrate is combinable with at least one of additional clean fluid or additional additives at one or more of the wells.

6. The fluid manufacturing plant of claim 1, wherein the fluid mixing system is operable to mix the sand, the clean fluid, and one or more fluid additives to form a second fracturing fluid concentrate that is different from the first fracturing fluid concentrate.

7. The fluid manufacturing plant of claim 1, wherein the pumping system is operable to pump the first fracturing fluid concentrate to a first well and a second well of the wells, the first well and the second well being located at different wellsites.

8. A system for conducting fracturing operations at multiple wells in a well field, the system comprising:

a fluid manufacturing plant located at the sand mine in the well field and operable to produce fracturing fluid concentrate, the fluid manufacturing plant comprising:
  a fluid mixing system;
  a sand processing system operable to receive sand produced from the sand mine and deliver the sand to the fluid mixing system;
  a clean fluid system in fluid communication with the fluid mixing system and operable to deliver clean fluid to the fluid mixing system;
  a fluid additive system in fluid communication with the fluid mixing system and operable to deliver one or more fluid additives to the fluid mixing system;
  wherein the fluid mixing system is operable to mix the sand, the clean fluid, and one or more fluid additives to form a first fracturing fluid concentrate and
  a pumping system operable to pump the first fracturing fluid concentrate from the fluid manufacturing plant to the wells via a pipeline; and well fracturing systems in fluid communication with the fluid manufacturing plant to receive the first fracturing fluid concentrate, each well fracturing system located at a respective well at one or more wellsites in the well field and remote from the fluid manufacturing plant and operable to inject the first fracturing fluid concentrate downhole into the respective well.

9. The system of claim 8, wherein a first well fracturing system of the well fracturing systems is located at a same wellsite as a second well fracturing system of the well fracturing systems.

10. The system of claim 8, wherein the fluid manufacturing plant further comprises a control system operable to control at least one of an amount or a flowrate of clean fluid, at least one of an amount or a flowrate of sand, and at least one of an amount or a flowrate of the one or more fluid additives delivered to the fluid mixing system.

11. The system of claim 8, wherein the pumping system is further operable to pump first fracturing fluid concentrate to a first well fracturing system and to pump a second fracturing fluid concentrate to a second well fracturing system, wherein the second fracturing fluid concentrate is different from the first fracturing fluid concentrate.

12. The system of claim 8, wherein each well fracturing system comprises:
  a wellsite clean fluid system in fluid communication with the well and operable to add additional clean fluid to the first fracturing fluid concentrate;
  a wellsite fluid additive system in fluid communication with the well and operable to add additional additive to the first fracturing fluid concentrate; and
  a fracturing pump system operable to inject the first fracturing fluid concentrate into the well.

13. The system of claim 12, wherein each well fracturing system further comprises a wellsite control system operable to control at least one of an amount or a flowrate of clean fluid from the wellsite clean fluid system and at least one of an amount or a flowrate of one or more fluid additives from the wellsite fluid additive system injected into the well.

14. The system of claim 8, wherein a first wellsite comprises a first concentrate storage that stores the first fracturing fluid concentrate produced by the fluid manufacturing plant and a second concentrate storage that stores a second fracturing fluid concentrate produced by the fluid manufacturing plant.

15. The system of claim 8, wherein a first well fracturing system of the well fracturing systems is located at a different wellsite than a second well fracturing system of the well fracturing systems.

16. The system of claim 8, wherein the first fracturing fluid concentrate is combinable with at least one of additional clean fluid or additional additive at one or more of the wells.

17. The system of claim 8, wherein the fluid mixing system is operable to mix the sand, the clean fluid, and one or more fluid additives to form a second fracturing fluid concentrate that is different from the first fracturing fluid concentrate.

18. The system of claim 8, wherein the pumping system is operable to pump the first fracturing fluid concentrate to a first well and a second well of the wells, the first well and the second well being located at different wellsites.

* * * * *